(12) United States Patent
Neidlein

(10) Patent No.: US 6,918,223 B2
(45) Date of Patent: Jul. 19, 2005

(54) CONNECTION ELEMENT FOR THE ALIGNED CONNECTING OF TWO MUTUALLY ADJOINED STRIPS

(75) Inventor: Harald Neidlein, Stuttgart (DE)

(73) Assignee: Dr. Ing. h.c.F. Porsche AG, Stuttgart (DE)

(*) Notice: Subject to any disclaimer, the term of this patent is extended or adjusted under 35 U.S.C. 154(b) by 55 days.

(21) Appl. No.: 10/372,108

(22) Filed: Feb. 25, 2003

(65) Prior Publication Data
US 2003/0159394 A1 Aug. 28, 2003

(30) Foreign Application Priority Data
Feb. 25, 2002 (DE) .......................... 102 08 060

(51) Int. Cl.⁷ .......................... B04C 2/38; B60R 19/42
(52) U.S. Cl. .................. 52/716.6; 52/716.5; 224/326; 293/128
(58) Field of Search .................. 52/716.5, 716.6, 52/716.7, 716.8, 208; 293/128, 1; 296/210, 213; 24/457, 297; 248/222.11, 231.81, 316.7

(56) References Cited

U.S. PATENT DOCUMENTS

| | | | | |
|---|---|---|---|---|
| 4,015,760 A | * | 4/1977 | Bott | 224/324 |
| 4,726,614 A | | 2/1988 | Myers et al. | |
| 4,828,303 A | * | 5/1989 | Soria | 293/128 |
| 4,838,004 A | * | 6/1989 | Adell | 52/716.6 |
| 4,911,349 A | * | 3/1990 | Miller | 224/326 |
| 4,969,674 A | | 11/1990 | Wagner | |
| 5,156,425 A | * | 10/1992 | Wagner | 293/128 |
| 5,353,571 A | * | 10/1994 | Berdan et al. | 52/716.5 |
| 5,575,527 A | | 11/1996 | Pfister | 296/213 |
| 6,668,430 B2 | * | 12/2003 | Ichimaru | 24/457 |

FOREIGN PATENT DOCUMENTS

| | | |
|---|---|---|
| DE | 40 07 391 | 9/1990 |
| DE | 40 23 126 | 3/1991 |
| DE | 4126442 | 10/1992 |
| DE | 41 26 442 | 10/1992 |
| DE | 19806531 | 8/1999 |
| DE | 198 08 531 | 8/1999 |
| EP | 0 527 440 | 2/1993 |

* cited by examiner

Primary Examiner—Ramon O. Ramirez
Assistant Examiner—Tan Le
(74) Attorney, Agent, or Firm—Crowell & Moring LLP

(57) ABSTRACT

Two mutually adjoined strips form a decorative covering for a vehicle having a connection element for the aligned connecting. This connection element, in one strip, consists of a detent hook and, in the other strip, consists of a detent hook receiving device. In the connected condition, the detent hook of one strip is held hooked into the detent hook receiving device of the other strip such that the exterior strip surfaces can be connected with one another at the same level and the strips can be connected with one another without gaps.

5 Claims, 2 Drawing Sheets

CONNECTION ELEMENT FOR THE ALIGNED CONNECTING OF TWO MUTUALLY ADJOINED STRIPS

BACKGROUND AND SUMMARY OF THE INVENTION

This application claims the priority of German Application No. 102 08 060.7 filed Feb. 25, 2002, the disclosure of which is expressly incorporated by reference herein.

The invention relates to a connection element for the aligned connecting of two mutually adjoined strips.

From German Patent Document DE 198 06 531 A1, a connection element for the aligned connecting of two mutually adjoined strips is known which is pushed into longitudinal grooves of the two strips and thereby mutually aligns the strips to be connected. Furthermore, from German Patent Document DE 41 26 442 C1, a connection device for strips of a motor vehicle is known, detent devices for a holding element being provided in the connection element.

It is an object of the invention to provide, by way of a connection element for two strips, a precisely aligned fastening of these strips on the motor vehicle body, in which case the connection element is to ensure in a simple manner a mounting of the strips with respect to one another without any readjustment.

According to the invention, this object is achieved by a connection element for the aligned connecting of first and second mutually adjoined strips, particularly decorative or covering strips of a motor vehicle, in each strip a connection element being arranged which can be locked with one another, wherein a detent hook is held as a first connection part of the first strip part, wherein a detent hook receiving device is arranged in the second strip as a second connection part, and wherein the detent hook receiving device has a guiding section for the detent hook which is situated in front in an insertion direction of the detent hook.

Additional advantageous features of preferred embodiments of the invention are described below and in the claims.

Important advantages achieved by the invention include achieving a simple mounting aid for the alignment of strips on the vehicle by means of the connection element consisting essentially of a detent hook and a detent hook receiving device.

In particular, a detent hook is held in a strip as a first connection element which is arranged to correspond with a second connection part in the second strip constructed as a detent hook receiving device. The detent hook receiving device has a guiding section for the detent hook which is in the front in the insertion direction of the detent hook. As a result of the two connection elements, one connection element respectively being arranged in each strip, an aligning of the strips and a connecting will automatically be achieved by means of a simple method of operation.

By means of a post, the detent hook is held in a longitudinal groove of one strip, and, on the free end, the detent hook is arranged which, by way of the guiding section closed on all sides can be inserted in a restrictedly guided manner in the detent hook receiving device for the additional strip. As a result of the guiding section, an unproblematic threading of the detent hook into the detent hook receiving device as well as a direct guiding of the detent hook into the receiving device is achieved. In particular, the guiding section of the detent hook receiving device is constructed as a dovetail, and the post of the detent hook has a section which corresponds with this guide and has a dovetail which, in the connected condition, is arranged in the guiding section.

As a result of the specifically constructed guiding section in the detent hook receiving device as well as a correspondingly constructed section at the post of the detent hook, a restricted guidance is ensured during the connecting operation and, in the connected condition, a secure and tolerance-precise mutual hold of the strips is ensured.

The connecting of the detent hook receiving device with the strip takes place by way of hook elements which are held in a clipped-in manner in a corresponding recess of the strip, and at least one other holding element is provided at the guiding section which is supported at and hooked to the front side of the strip. This type of connection of the detent hook receiving device takes place in a simple manner without any additional screwing devices.

As a result of the assignment of the detent hook with respect to the detent hook receiving device, an exterior strip surface which has an identical level and has no gap is achieved when the strips are fitted together, without the requirement of any refinishing.

An embodiment of the invention is illustrated in the drawings and will be described in detail in the following.

Other objects, advantages and novel features of the present invention will become apparent from the following detailed description of the invention when considered in conjunction with the accompanying drawings.

DETAILED DESCRIPTION OF THE DRAWINGS

Figure 1:
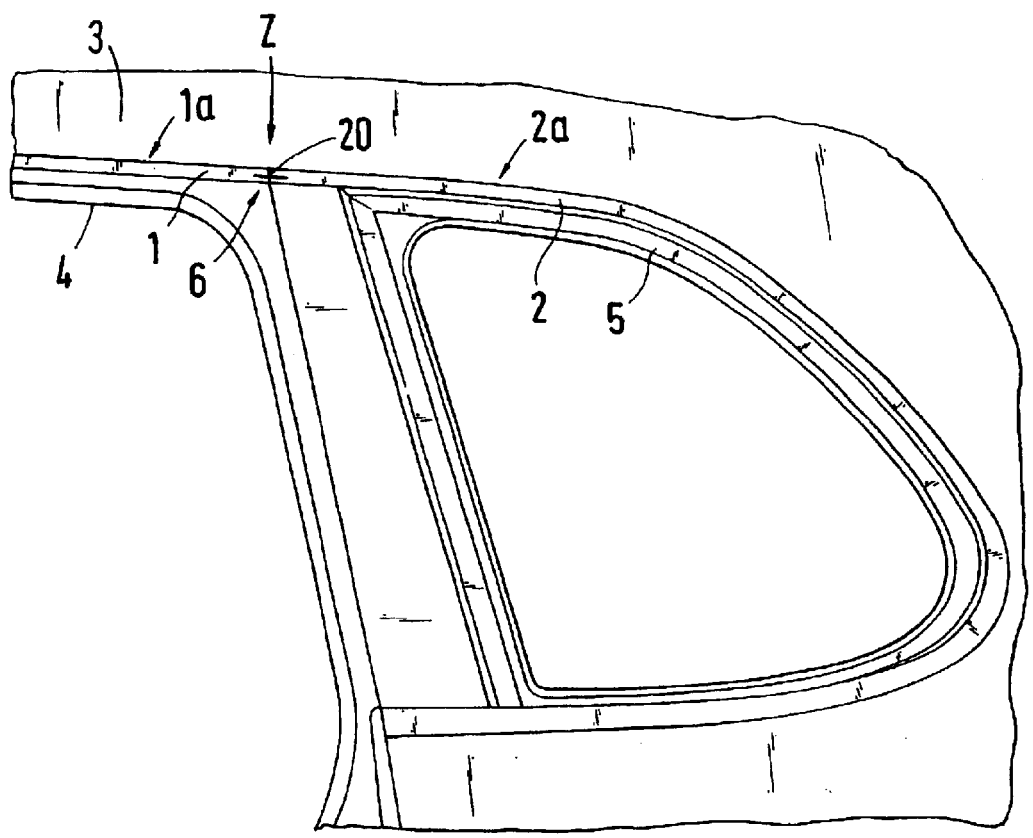
FIG. 1 is a view of a side wall of a vehicle having a forward strip or a forward covering strip and a rearward covering strip with respect to a vehicle column.

A connection element 6 is used for the aligned connecting of two strips 1, 2, particularly of covering and/or decorative strips of a vehicle, which are arranged, for example, between a roof 3 and a door frame 4 or a window frame 5. This connection element comprises essentially a detent hook 7 in the strip 1 and a detent hook receiving device 8 in the additional strip 2. When the strips 1 and 2 are pushed together, these parts 7 and 8 are hooked together in a self-acting abutting manner and are connected. In the strip 1, the detent hook 7 is held as a first connection element in a longitudinal groove 9 by way of a post 14, and, in the strip 2, the detent hook receiving device 8 with the detent hook 16, as the second connection element, is fastened in a recess 10 by way of hook elements 11 and 11*a*.

At the forward free end 12, the detent hook receiving device 8 comprises a guiding section 13 closed on all sides, by means of which the detent hook 7 can be inserted into the receiving device 8 which, corresponding with this section 13, has a section 15 at the post 14. The section 13 forms a dovetail guide 13*a* and the section 15 forms a dovetail 15*a*, so that a precise restricted guiding is provided.

Figure 2:
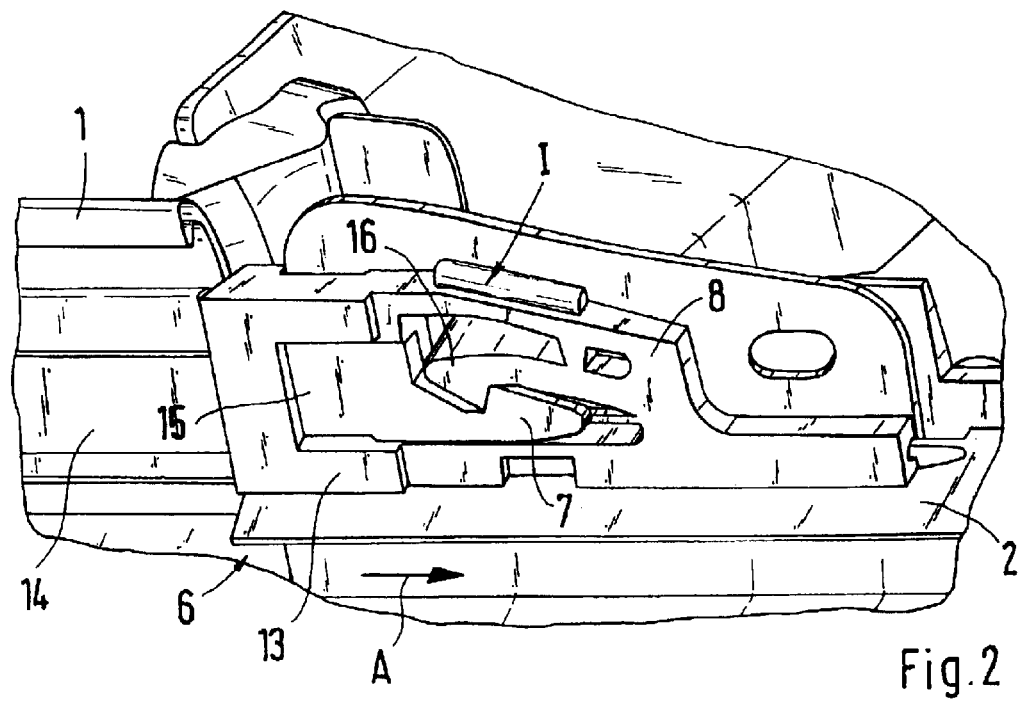
FIG. 2 is a diagrammatic representation of the connection element constructed according to a preferred embodiment of the present invention and essentially consisting of a detent hook and a detent hook receiving device.
Figure 3:
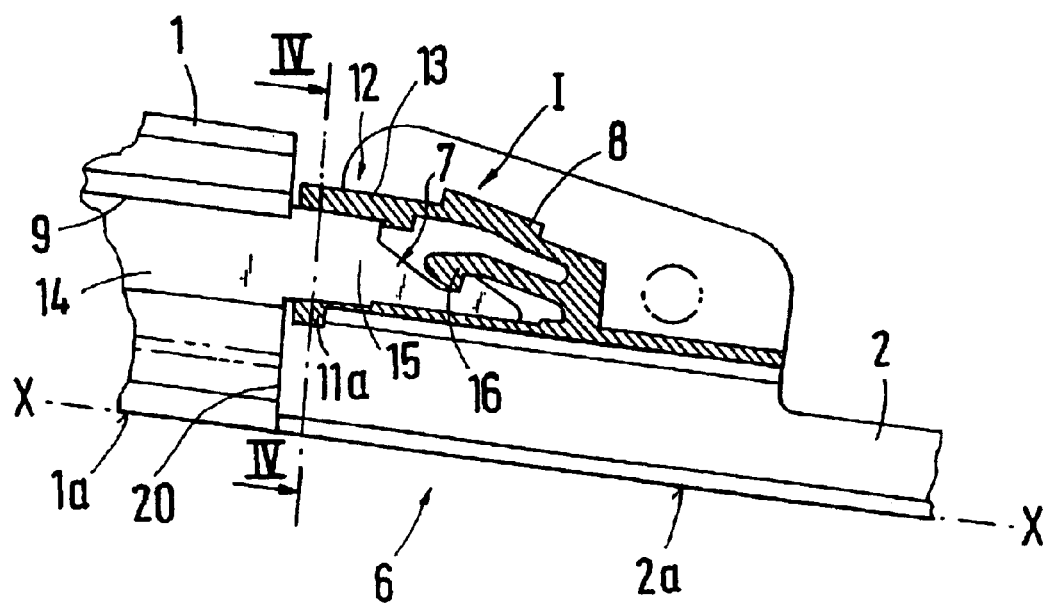
FIG. 3 is a sectional view of the connection element in the direction of the arrow Z according to FIG. 1.
Figure 4:
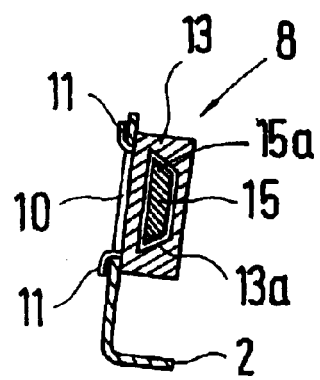
FIG. 4 is a sectional view of the connection element according to Line IV—IV of FIG. 3.

As illustrated in detail in FIGS. 2 and 3, after the pushing-together of the strips 1 and 2 in an abutting manner, in the connected position I, the detent hook 7 reaches behind the opposite detent hook 16 in the detent hook receiving device 8, so that a firm connection of the two strips 1 and 2 is established. For this purpose, the detent hook 16 has an elastic construction. As a result of the precise alignment of the two detent hooks 7 and 16 with respect to one another, the exterior surfaces 1a and 2a of the strips 1 and 2 can be aligned at the same level in a plane X—X and, in addition, the strips 1 and 2 are held with respect to one another without any gaps 20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Connection element having first and second mutually adjoined, particularly decorative or covering strips of a motor vehicle, in each strip a connection element being arranged which can be locked with one another, wherein a detent hook is held as a first connection part of the first strip part and is arranged at a free end of the first strip and held by a post in a longitudinal groove of the first strip, wherein a detent hook receiving device is arranged in the second strip as a second connection part, wherein the detent hook receiving device has a guiding section which is closed on all sides for receiving the detent hook in a restrictedly guided manner in a longitudinal direction, the guiding section being situated in front in an insertion direction of the detent hook, and wherein the detent hook receiving device is held by way of hook elements in a clipped-in manner in a recess of the second strip, and at least one additional hook element is provided at the guiding section and is supported on the front side of the strip.

2. Connection element according to claim 1, wherein the detent hook receiving device comprises a second detent hook situated opposite the detent hook, which second detent hook, in the connected position, adjusts the two opposed visible surfaces of the strips at the same level with respect to one another.

3. Connection element having first and second mutually adjoined, particularly decorative or covering strips of a motor vehicle, in each strip a connection element being arranged which can be locked with one another, wherein a detent hook is held as a first connection part of the first strip part and is arranged at a free end of the first strip and held by a cost in a longitudinal groove of the first strip, wherein a detent hook receiving device is arranged in the second strip as a second connection part, wherein the detent hook receiving device has a guiding section which is closed on all sides for receiving the detent hook in a restrictedly guided manner in a longitudinal direction, the guiding section being situated in front in an insertion direction of the detent hook, wherein the guiding section of the detent hook receiving device is constructed as a dovetail guide, and the post has a section which corresponds with this guide and has a dovetail which is arranged in the guiding section in the connected condition, and wherein the detent hook receiving device is held by way of hook elements in a clipped-in manner in a recess of the second strip, and at least one additional hook element is provided at the guiding section and is supported on the front side of the strip.

4. Connection element having first and second mutually adjoined, particularly decorative or covering strips of a motor vehicle, in each strip a connection element being arranged which can be locked with one another, wherein a detent hook is held as a first connection cart of the first strip part and is arranged at a free end of the first strip and held by a post in a longitudinal groove of the first strip, wherein a detent hook receiving device is arranged in the second strip as a second connection part, wherein the detent hook receiving device has a guiding section which is closed on all sides for receiving the detent hook in a restrictedly guided manner in a longitudinal direction, the guiding section being situated in front in an insertion direction of the detent hook, and wherein the detent hook receiving device comprises a second detent hook situated opposite the detent hook, which second detent hook, in the connected position, adjusts the two opposed visible surfaces of the strips at the same level with respect to one another.

5. Connection element having first and second mutually adjoined, particularly decorative or covering strips of a motor vehicle, in each strip a connection element-being arranged which can be locked with one another, wherein a detent hook is held as a first connection part of the first strip part and is arranged at a free end of the first strip and held by a post in a longitudinal groove of the first strip, wherein a detent hook receiving device is arranged in the second strip as a second connection part, wherein the detent hook receiving device has a guiding section which is closed on all sides for receiving the detent hook in a restrictedly guided manner in a longitudinal direction, the guiding section being situated in front in an insertion direction of the detent hook, wherein the guiding section of the detent hook receiving device is constructed as a dovetail guide, and the cost has a section which corresponds with this guide and has a dovetail which is arranged in the guiding section in the connected condition, and wherein the detent hook receiving device comprises a second detent hook situated opposite the detent hook, which second detent hook, in the connected position, adjusts the two opposed visible surfaces of the strips at the same level with respect to one another.

* * * * *